(12) United States Patent
DeCraene

(10) Patent No.: US 6,959,084 B1
(45) Date of Patent: Oct. 25, 2005

(54) NETWORK INTERFACE UNIT SHELF ASSEMBLY WITH MULTI-POSITIONABLE CUSTOMER INTERFACE MODULE

(75) Inventor: Paul T. DeCraene, West Chicago, IL (US)

(73) Assignee: HyperEdge Corporation, Batavia, IL (US)

( * ) Notice: Subject to any disclaimer, the term of this patent is extended or adjusted under 35 U.S.C. 154(b) by 0 days.

(21) Appl. No.: 08/929,019

(22) Filed: Sep. 15, 1997

(51) Int. Cl.[7] .............................................. H04M 9/08
(52) U.S. Cl. .............................. 379/413.02; 379/413.04
(58) Field of Search ................................ 379/397, 399, 379/325, 413.02, 413.04, 399.01; 361/686, 361/788, 796, 797, 826; 439/532

(56) References Cited

U.S. PATENT DOCUMENTS

| | | | | |
|---|---|---|---|---|
| 3,755,630 A | * | 8/1973 | Boyer | ........................ 379/325 |
| 3,784,728 A | * | 1/1974 | De Bortoli et al. | ......... 379/325 |
| 4,152,750 A | * | 5/1979 | Bremenour et al. | ........ 361/686 |
| 4,242,721 A | * | 12/1980 | Krolak et al. | ............... 361/796 |
| 4,303,296 A | * | 12/1981 | Spaulding | ................... 361/796 |
| 4,860,350 A | | 8/1989 | Smith | |
| 4,909,757 A | | 3/1990 | Reed | |
| 4,945,560 A | * | 7/1990 | Collins et al. | .............. 379/399 |
| 5,295,842 A | | 3/1994 | Ozaki et al. | |
| 5,359,654 A | * | 10/1994 | Jensen et al. | ............... 379/397 |
| 5,595,316 A | | 1/1997 | Gallarelli et al. | |
| 5,596,174 A | | 1/1997 | Sapienza | |

* cited by examiner

*Primary Examiner*—Jefferey F. Harold
(74) *Attorney, Agent, or Firm*—Patula & Associates, P.C.

(57) ABSTRACT

A telecommunication equipment device in the form of a wall rack assembly used to accommodate a plurality of network interface units and used to interconnect a plurality of service lines of the network service provider with the customer's lines to serve as a demarcation point for legal tariff issues. The wall assembly includes a shelf assembly having at least two customer interface module connectors, each capable of receiving a detachable customer interface module, thus allowing flexibility in mounting in difficult to access areas, such as a corner of a room, closet, etc. In furtherance of the space saving and flexible mounting advantages, the wall assembly further includes a cover which can be installed and removed by lifting straight out away from the shelf assembly.

22 Claims, 4 Drawing Sheets

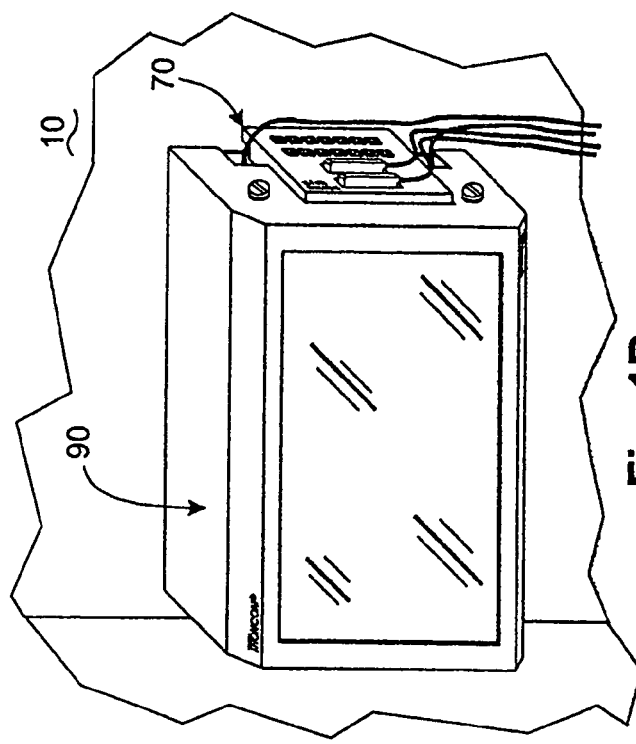
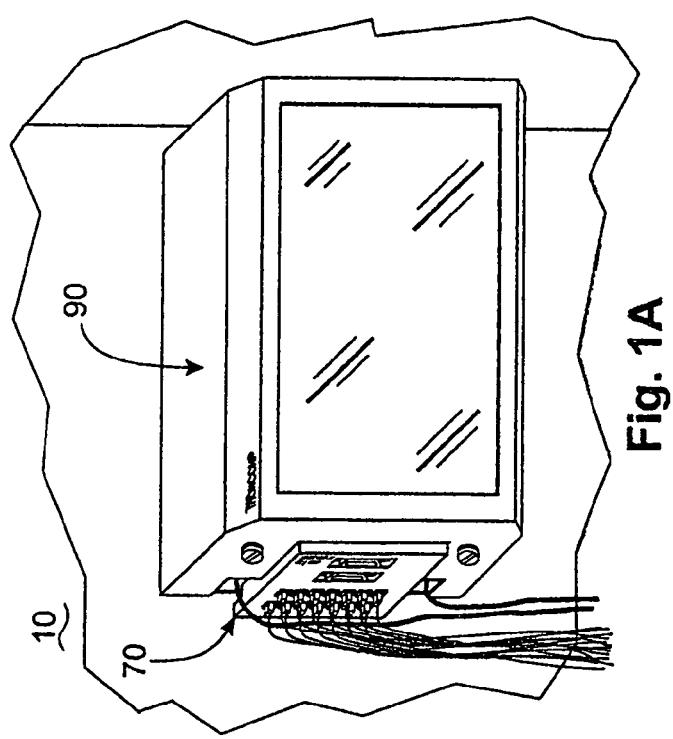

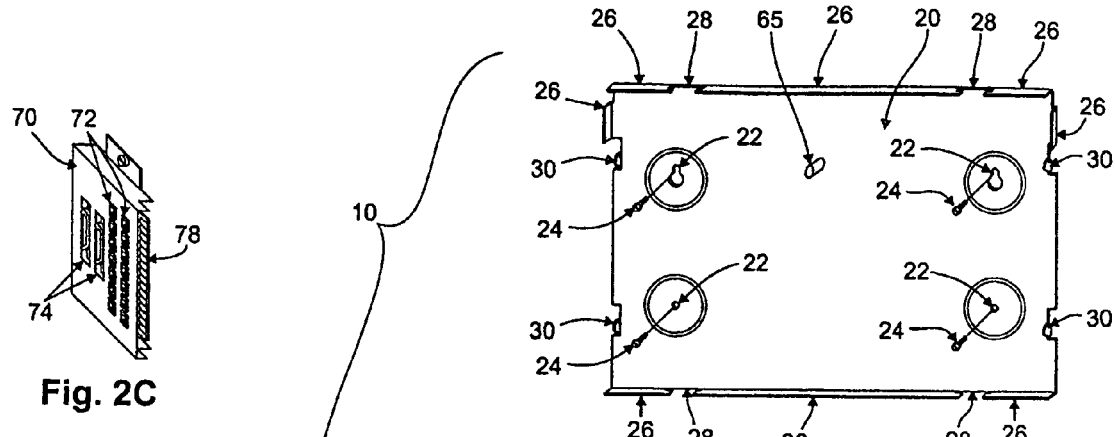
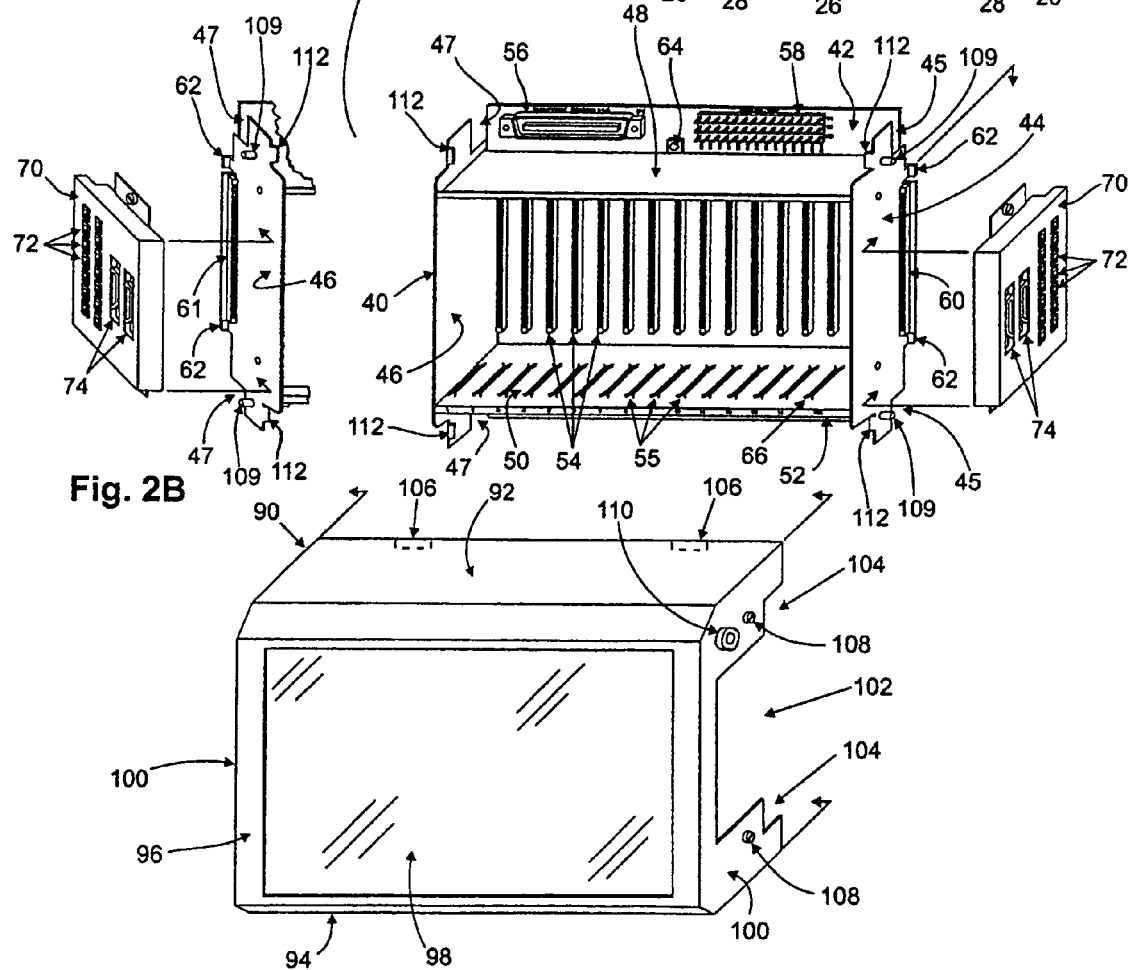
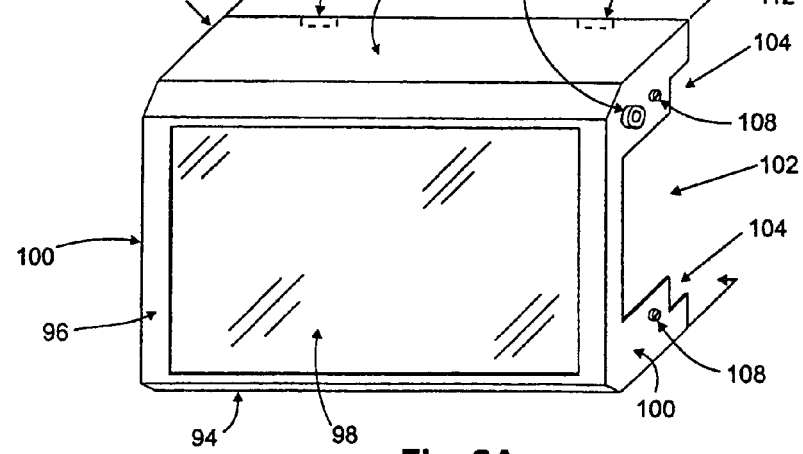

NETWORK INTERFACE UNIT SHELF ASSEMBLY WITH MULTI-POSITIONABLE CUSTOMER INTERFACE MODULE

The present invention relates to network interface unit shelf assemblies and, in particular, a shelf assembly that allows for multi-positionable connection of the customer interface module, specifically a shelf assembly having at least two customer interface module connectors to allow flexibility in mounting the shelf assembly in the presence of an obstruction such as in a corner, etc.

BACKGROUND OF THE INVENTION

Network interface units are telecommunication transmission equipment that a network service provider, such as a telephone operating company or long distance carrier, places between their lines and the customer's lines. The network interface units provide a demarcation point for legal tariff issues.

Network interface units are typically stored on a shelf assembly which also provides for the Local Exchange Carrier (LEC) facility connections and the Customer Premise Equipment (CPE) connections which are made via a customer interface module attached to the shelving assembly. Such a shelving assembly is typically mounted in some location at the customer's business. However, many locations where the shelving assembly is mounted can be difficult to access from one or more sides due to space restrictions or obstructions on the mounting surface. This presents a problem in that mounting can be very difficult or additional space may be required to provide access to the shelf assembly and the connections thereto, as well as for the wiring of the connectors. Accordingly, there is a need to provide a compact shelving assembly which is flexible in mounting options.

Prior art network interface unit shelf assemblies provide a single, fixed customer interface module along the top or bottom of the shelf. While this helps for mounting the shelf in a corner, additional wall space is required at the top and bottom for access to the connectors and wiring. Prior art network interface unit shelf assemblies that provide a single, fixed customer interface unit along one side prevents the shelf assembly from being mounted in the corner. Additionally, such known prior art network interface unit shelf assemblies typically include panels which contain a door or panel which swings open to provide access to the network interface units. Such doors or panels require additional space for mounting the shelf assembly to allow for proper access to the network interface units and the shelf assembly.

The present invention, however, solves the problems of mounting a network interface unit shelf assembly in a location where prior art shelf assemblies cannot be mounted. The present invention provides for a multi-positionable customer interface module, as well as a cover which can be removed by lifting straight out.

BRIEF SUMMARY OF THE INVENTION

The present invention comprises a shelf assembly for network interface units. The shelf assembly includes on each side thereof a connector for receiving a customer interface module. In this manner, the customer interface module can be connected to either connector on either side of the shelf assembly. As such, the shelf assembly provides for flexibility in mounting the shelf assembly in locations where prior art shelf assemblies could not previously be mounted, such as in the corner of a room. Additionally, the main cover of the shelf assembly can be attached and removed by lifting straight outward. The customer interface modules of the present invention provide for CPE connections to be made toward the side of the shelving assembly as opposed to towards the mounting wall as is the case with prior art shelf assemblies. The present invention can be used by any communication network service provider such as telephone operating companies, long distance carriers, internet service providers, alternate local exchange carriers, competitive access providers, etc.

Accordingly, it is the principle object of the present invention to provide a network interface unit shelf assembly having improved mounting ability.

It is a further object of the present invention to provide a network interface unit shelf assembly having a selectively detachable and multi-positionable customer interface module.

It is also an object of the invention to provide a cover for the shelving assembly which can be removed by lifting straight out.

Numerous other advantages and features of the invention will become readily apparent from the detailed description of the preferred embodiment of the invention, from the claims and from the accompanying drawings in which like numerals are employed to designate like parts throughout the same.

BRIEF DESCRIPTION OF THE DRAWINGS

A fuller understanding of the foregoing may be had by reference to the accompanying drawings wherein:

FIG. 1A is a perspective view of the present invention mounted in a corner and having the customer interface module on the left side of the shelf assembly.

FIG. 1B is a perspective view of the present invention mounted in an opposite corner and having the customer interface module mounted on the right side of the shelf assembly.

FIG. 2A is an exploded perspective view of the present invention illustrating the customer interface module positioned for attachment on the right side of the shelf assembly.

FIG. 2B is a partially broken away exploded perspective view of the present invention illustrating the customer interface module positioned for attachment on the left side of the shelf assembly.

FIG. 2C is a perspective view of the customer interface unit of the present invention.

DETAILED DESCRIPTION OF THE PREFERRED EMBODIMENTS OF THE PRESENT INVENTION

Figure 4A:
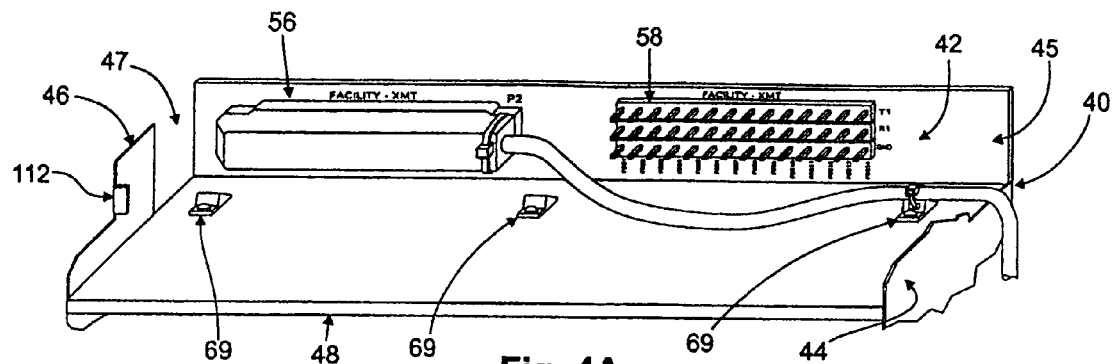
FIG. 4A is a partially broken away top perspective view of the top portion of the shelf assembly having the wiring exit on the right side.

While the invention is susceptible of embodiment in many different forms, there is shown in the drawings and will be described herein in detail preferred and alternate embodiments of the present invention. It should be understood, however, that the present disclosure is to be considered an exemplification of the principles of the invention and is not intended to limit the spirit and scope of the invention and/or claims of the embodiment illustrated.

FIG. 1 illustrates generally the present invention in use as mounted on a wall. Specifically, FIG. 1A illustrates present invention 10 being mounted proximate a right hand corner of two walls. The selectively detachable and positionable customer interface module 70 can be seen mounted on the left hand side of the invention 10. Cover 90 is shown in use on the shelf assembly of the present invention 10. Alternatively, FIG. 1B illustrates present invention 10 mounted proximate a left hand corner of two walls. The selectively detachable and positionable customer interface module 70 is shown attached on the right hand side of present invention 10. Cover 90 is shown in place on the shelf assembly of the present invention 10. Accordingly, the present invention 10 allows flexibility in the location of mounting which is extremely advantageous due to space limitations in the locations for mounting of a network interface unit shelf assembly.

Referring now to FIG. 2, the present invention 10 is illustrated in an exploded perspective view. The present invention 10 incorporates four main components: back plate 20, shelf assembly 40, customer interface module 70 and cover 90.

Back plate 20 is attached to the mounting wall and is used to support shelf assembly 40 thereto. Back plate 20 includes mounting holes 22, mounting screws 24, which secure back plate 20 to the wall. Back plate 20 further includes flanges 26 extending outward away from the wall and retaining tabs 30 extending outward away from the wall. Flanges 26 include locking slots 28 for receiving locking tabs 106 of cover 90. Retaining tabs 30 receive mounting tabs 62 of shelf assembly 40 for securely mounting the shelf assembly to the back plate 20.

Shelf assembly 40 is comprised of a printed circuit board 42 having first side flange 44 mounted thereto in a perpendicular fashion. Similarly, shelf assembly 44 includes second side flange 46, top flange 48 and bottom flange 50 mounted thereto in a perpendicular fashion. Printed circuit board 42, first side flange 44, second side flange 46, top flange 48 and bottom flange 50 are configured to define a housing area 52 for receiving a plurality of network interface units. It should be understood that the present invention can be utilized in connection with any type of network interface units, such as digital, analog and fiber network interface units.

Mounted on printed circuit board 42 are a plurality of network interface unit connectors 54 for connecting network interface units. Aligned with the network interface unit connectors 54 are guide slots 55 provided on bottom flange 50 of shelf assembly 40, as well as on top flange 48 (see FIG. 3). Guide slots 55 align the network interface units with the connectors 54. Mounted on the printed circuit board 42 above top flange 48 are the network modular connector for facility transmit (XMT) 56, as well as wire wrapped posts for facility transmit (XMT) 58. Similarly, mounted on printed circuit board 42 are network modular connector for facility receive (RCV) 57 and wire wrapped posts for facility receive (RCV) 59 (see FIG. 3). Additionally, mounted to printed circuit board 42 are two customer interface module connectors 60 and 61 just outside of first side flange 44 and second side flange 46, respectively.

First side flange 44 and second side flange 46 each include two mounting tabs 62 for cooperating with the retaining tab 30 on back plate 20. To secure shelf assembly 40 to back plate 20, shelf assembly 40 includes a self-contained securing screw 64 which cooperatively engages a standoff 65 on back plate 20 when screw 64 is tightened to prevent the shelf assembly 40 from disengaging from back plate 20, thus providing a secure mounting of shelf assembly 40 to back plate 20.

Shelf assembly 40 further includes means for connecting a power source. Accordingly, an internal power supply can be inserted into internal power supply slot 66 to engage internal power supply connector 67 on printed circuit board 42 (see FIG. 3). Below bottom flange 50 of shelf assembly 40, an external power connection 68 is provided on circuit board 42 (see FIG. 3).

Customer interface module 70 is shown in position to be connected with customer interface module connector 60 on the right side of shelf assembly 40 or along first side flange 44. Similarly, in FIG. 2B, customer interface module 70 is shown positioned to be attached to the customer interface module connector 61 at the left side of shelf assembly 40 or along second side flange 46. To switch from one side to the other, the customer interface module 70 simply need be rotated 180° such that the complimentary connector 78 (see FIG. 2C) on the customer interface module 70 can be fitted with the customer interface module connectors 60 and 61 of the shelf assembly. Connectors 60 and 61 are preferably female connectors which receive the complimentary male connector 78, however, various types of suitable connectors could be utilized. Customer interface module 70 is shown including phone jacks 72, as well as amphenol type connectors 74. Preferably, as is shown, customer interface module 70 includes at least one mounting flange having a screw which is received in a threaded hole on first side flange 44 or second side flange 46 to provide a secure mount thereto.

Cover 90 is shown in position to be mounted over the shelf assembly 40. Cover 90 includes top 92, bottom 94, front 96 having window 98 therein, and first and second sides 100. One of the first and second sides 100 includes a main cutout or opening 102, as well as network wiring cutouts or openings 104. Shown in phantom extending from top 92 of cover 90 are locking tabs 106 which are received in locking cover slots 28. It should be understood that bottom 94 further includes locking tabs 106 for engagement with back plate 20.

Two self-contained securing screws 108 are provided on at least one side 100. Screws 108 cooperatively engage standoffs 109 on first and second side flanges 44 and 46 to securely fasten cover 90 to shelf assembly 40. Additionally, a main cover lock 110 can be provided to prevent unwanted access to housing area 52 and printed circuit board 42 and any connections thereon. Lock 110 can take any suitable form, such as a locking cam which cooperatively engages tabs 112 on first and second side flanges 44 and 46.

Cover 90 is illustrated as having opening 102 on the right for mounting when the customer interface module 70 is mounted on the right side of assembly 40. When the customer interface module 70 is to be mounted on the left side of assembly 40, the cover 90 simply need be rotated 180° such that opening 102 is positioned to the left of assembly 40. In this position, screws 108 cooperate with standoffs 109 on second side flange 46 as opposed to standoffs 109 on first side flange 44 when positioned to the right. Similarly, lock 110 cooperates with the lower tab 112 on second side flange 46 as opposed to the upper tab 112 on first side flange 44 when positioned to the right. It should be understood that cover 90 could include openings on both sides so that it need not be rotated, however, this would expose the customer interface module connector which is not in use, unless a separate panel or cover is provided for the opening.

Figure 3:
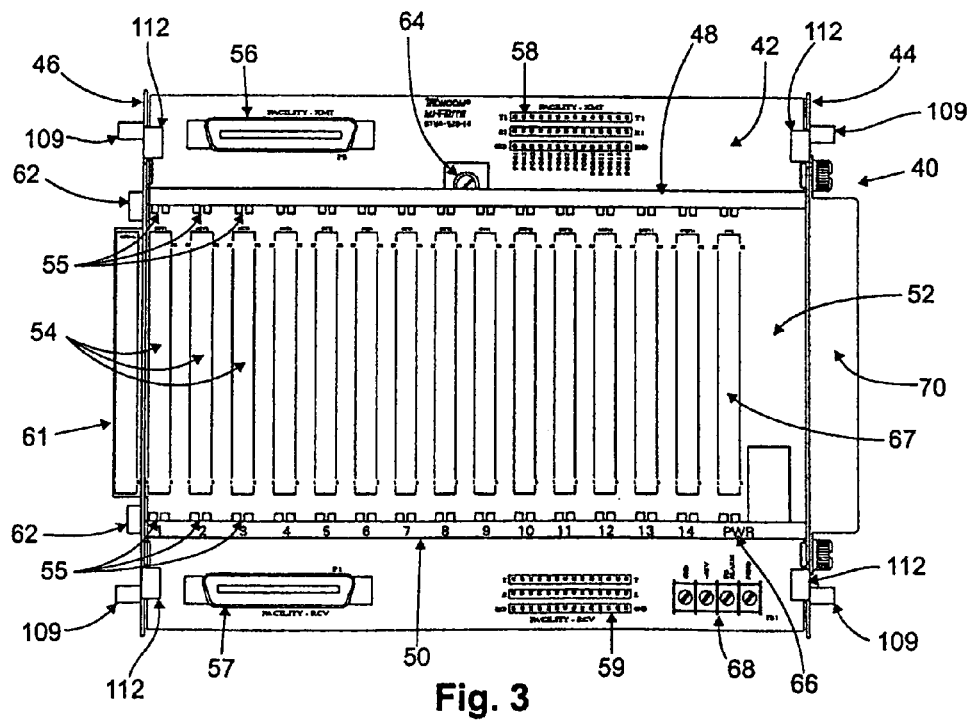
FIG. 3 is a front view of the shelf assembly and customer interface module of the present invention.

Referring now to FIG. 3 in more detail, shelf assembly 40 can be seen from a front view and including printed circuit 42 and first side flange 44, second side flange 46, top flange 48 and bottom flange 50 mounted thereto in a perpendicular fashion to define housing area 52. A plurality of network interface unit connectors 54 are mounted to circuit board 42 inside housing area 52. Guide slots 55 are provided to align the network interface units with the connectors 54. Mounted above top flange 48 on printed circuit board 42 are the network modular connector for facility XMP 56 and the wire wrap posts for facility XMT 58. Similarly, mounted below bottom flange 50 on printed circuit board 42 are the network modular connector for facility RCV 57 and the wire wrap post for facility RCV 59. Customer interface module 70 is shown mounted at the right side of shelf assembly 40 or along first side flange 44 and being connected to the customer interface module connector 60 not shown. As can be seen on the opposite or left side, along the second side flange 46 is the customer interface module connector 61 which is not in use. Mounting tabs 62 can be seen along second side flange 46. However, the mounting tabs 62 remains hidden behind customer interface module 70 on the opposite side.

Shelf assembly 40 further includes internal power supply option slot 66, as well as internal power supply option connector 67 mounted on printed circuit board 42. External power connections 68 are also mounted on printed circuit board 42 below the bottom flange 50.

Figure 4B:
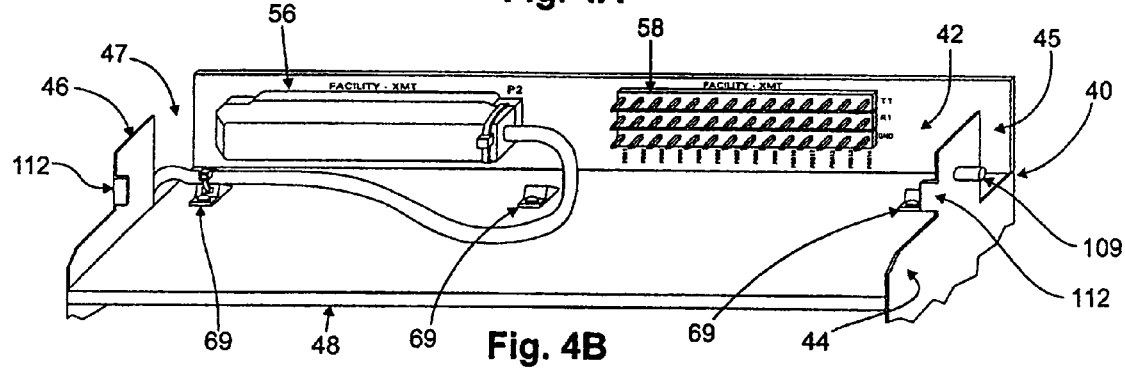
FIG. 4B is a partially broken away top perspective view of the top portion of the shelf assembly having the wiring exit on the left side.

FIGS. 4A and 4B illustrate a broken away perspective view of the top portion of shelf assembly 40. As can be seen, first side flange 44 and second side flange 46 include cutout portions or cable exits 45 and 47, respectively. These cutouts or exits allow cables from the connections of the network modular connector 56 or wire wrapped post 58 to exit from cover 90.

FIG. 4A shows network modular connector 56 in use wherein the cable from the connection exits cable exit cutout 45. Similarly, FIG. 4B illustrates the cable from the connection of the network modular connector 56 exiting the opposite side of FIG. 4 or out cable exit 47. Mounted to top flange 48 are a plurality of cable ties 69 which securely hold the cable from the connector 56 or 58. It should be understood that cable connections for connectors 57 and 59 exit below bottom flange 50 in the same manner.

Figure 5A:
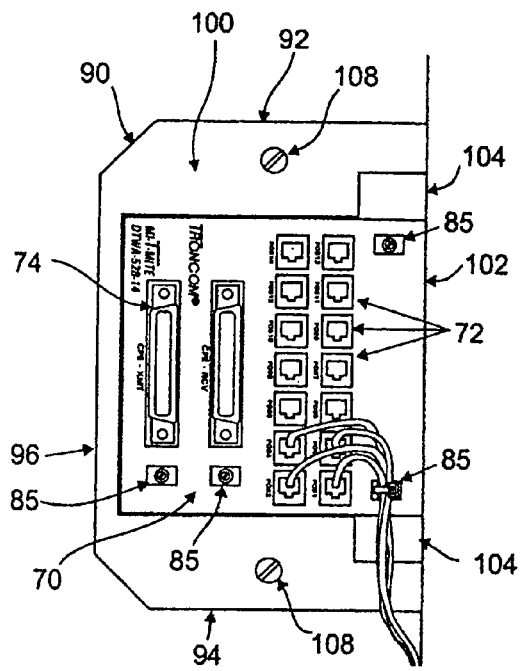
FIG. 5A is a side view of the present invention with the customer interface module mounted on the right side thereof and having the modular phone jacks in use.
Figure 5B:
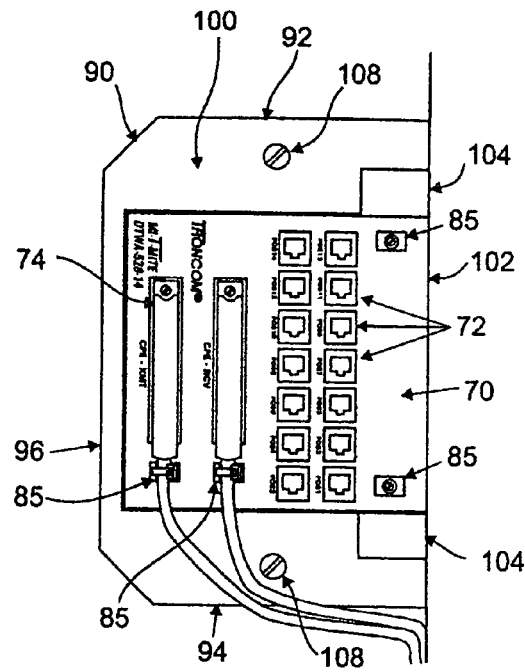
FIG. 5B is a side view of the present invention with the customer interface module mounted on the right side thereof and having the modular connectors in use.
Figure 5C:
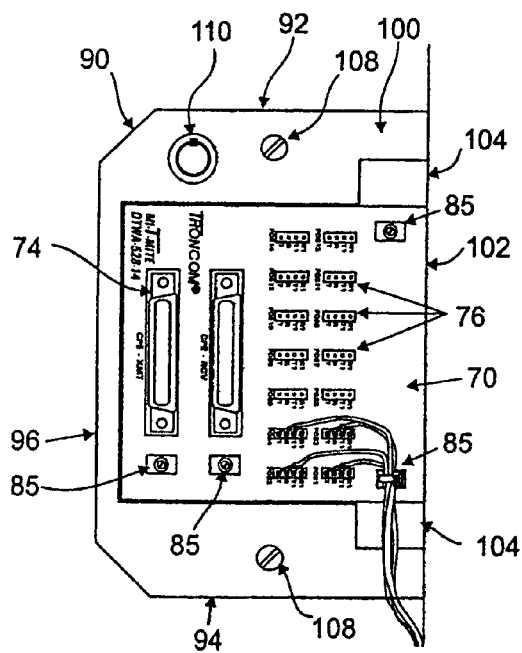
FIG. 5C is a side view of the present invention with the customer interface module mounted on the right side thereof and having wire wrap posts in use.
Figure 5D:
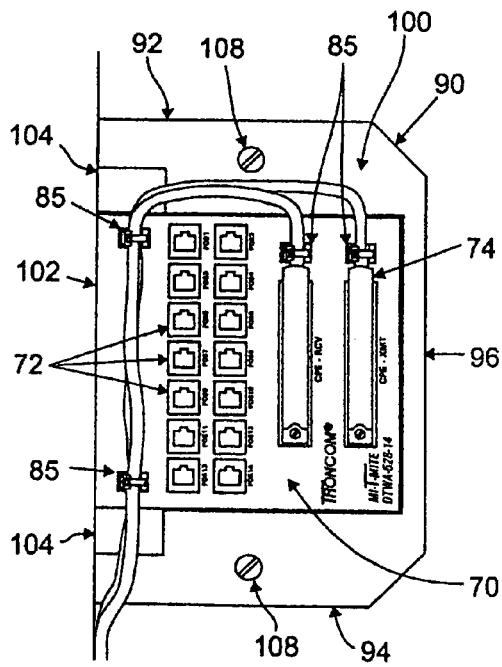
FIG. 5D illustrates the side view of the present invention with the customer interface module mounted on the left side thereof and having the modular connectors in use.

FIGS. 5A through 5C illustrate side views of the present invention in use on a wall wherein the customer interface module 70 is mounted on the right side of shelf assembly 40 along first side flange 44. FIG. 5D illustrates the customer interface module 70 mounted on the left side of shelf assembly 40 or along the second side flange 46.

FIG. 5A illustrates the phone jacks 72 in use. FIG. 5B illustrates the amphenol type connectors 74 in use. FIG. 5C illustrates an alternate embodiment of the customer interface module wherein the phone jacks 72 have been replaced by wire wrapped posts 76 which are in use. FIG. 5D illustrates the amphenol type connectors 74 in use on the customer interface module 70.

As can be seen by comparing FIG. 5B and FIG. 5D, customer interface module 70 has been rotated 180° to allow proper connection with connectors 60 and 61, respectively. Customer interface module 70 is further preferably provided with cable ties 85 for securing connection wires thereto. Cover 90 is shown mounted over shelf assembly 40 in FIGS. 5A through 5D. Main opening 102 of cover 90 allows access to the connections on the customer interface module 70. Network wiring opening 104 can be seen in cover 90 to allow cable exits of the network modular connectors 56 or 57 and the wire wrapped posts 58 and 59 which reside inside of cover 90, as can be seen in FIGS. 1A and 1B.

Each one of the connectors 72 and 74 on the customer interface unit 70 is preferably numbered and corresponds and is wired to a specific network interface unit connector 54. Accordingly, it should be understood that customer interface module connectors 60 and 61 are inversely wired such that when the customer interface unit 70 is rotated 180° for connection to either connector 60 or 61, each one of the numbered connectors 72 and 74 always corresponds to the same network interface unit connector 54.

It is to be understood that the embodiments herein described are merely illustrative of the principles of the present invention. Various modifications may be made by those skilled in the art without departing from the spirit or scope from the claims which follow. For example, the shelf assembly could be configured for mounting essentially 900 from that illustrated, or with the customer interface module female connectors provided at the top and bottom of the shelf assembly. Such configurations would allow for installation at a floor or a ceiling, etc. Further, it is foreseen that two or more customer interface module female connectors could be provided at the sides, top, bottom, or all four sides of the shelf assembly to allow for maximum flexibility in installation. It is foreseen that all connectors on the assembly 40 could be suitably arranged in any location on the assembly, such as all above top flange 48 or on top flange 48, or all below bottom flange 50 or on bottom flange 50, etc.

What is claimed is:

1. A wall rack assembly comprising:
    a shelf assembly for selectively receiving at least one network interface unit;
    at least one customer interface module connector on the shelf assembly, said at least one customer interface module connector being operatively connected to said at least one network interface unit when the at least one network interface unit is selectively received in the shelf assembly; and
    a customer interface module selectively connectable to said at least one customer interface module connector;
    wherein said customer interface module comprises at least one customer line connector and an edge connector for connecting with said at least one customer interface module connector, said at least one customer line connector being operatively connected to said edge connector.

2. The assembly of claim 1, further comprising a cover for said shelf assembly.

3. The assembly of claim 2, wherein said cover includes side openings for allowing placement of said cover around said customer interface module.

4. An improved shelf assembly for telecommunications network interface units, said shelf assembly including a printed circuit board for interconnecting customer lines with network service provider lines through said network interface units, said customer lines being connected to a customer interface which is operatively connected to said printed circuit board, said network service provider lines being connected to said printed circuit board via connectors provided on said printed circuit board, said improvement comprising:

at least two customer interface module connectors provided on said printed circuit board, and said customer interface comprising a customer interface module having at least one customer line connector and an edge connector for connecting with said at least two customer interface module connectors, said at least one customer line connector being operatively connected to said edge connector, said customer interface module being selectively connected to either of said at least two customer interface module connectors to afford flexibility in mounting said shelf assembly.

5. The improved shelf assembly of claim 4, further comprising a cover for said shelf assembly, said cover having at least two customer interface module receiving openings to allow said cover to be positioned over said shelf assembly when said customer interface module is connected to either of said at least two customer interface module connectors.

6. A shelf assembly for receiving a plurality of telecommunications network interface units and for interconnecting customer lines with network service provider lines, said shelf assembly comprising:

a printed circuit board;

a plurality of network interface unit connectors on said printed circuit board for receiving said network interface units; and at least two customer interface module connectors for selectively and independently receiving a customer interface module;

wherein each of said plurality of network interface unit connectors is operatively connected to each of said at least two customer interface module connectors.

7. The shelf assembly of claim 6, wherein said shelf assembly further includes a top flange, a bottom flange, a first side flange and a second side flange, said top, bottom, first and second side flanges being positioned generally perpendicular to said printed circuit board and forming a housing area for said network interface units.

8. The shelf assembly of claim 7, wherein said at least two customer interface module connectors include a first customer interface module connector positioned along said first side flange and a second customer interface module connector positioned along said second side flange.

9. The shelf assembly of claim 7, further comprising a cover for selectively enclosing said printed circuit board, said top flange, said bottom flange, said first side flange and said second side flange.

10. The shelf assembly of claim 9, wherein said cover includes at least two cut out portions to allow clearance of said customer interface module.

11. The shelf assembly of claim 9, wherein said shelf assembly is removably mounted to a back mounting plate.

12. The shelf assembly of claim 6, wherein said at least two customer interface module connectors are inversely operatively connected to said plurality of network interface unit connectors.

13. A shelf assembly for receiving a plurality of telecommunications network interface units and for interconnecting customer lines with network service provider lines, said shelf assembly comprising:

a printed circuit board;

a plurality of network interface unit connectors on said printed circuit board for receiving said network interface units; and at least two customer interface module connectors for selectively and independently receiving a customer interface module;

wherein said shelf assembly further includes a top flange, a bottom flange, a first side flange and a second side flange, said top, bottom, first and second side flanges being positioned generally perpendicular to said printed circuit board and forming a housing area for said network interface units; and wherein said at least two customer interface module connectors include a first customer interface module connector positioned along said first side flange and a second customer interface module connector positioned along said second side flange; and wherein said customer interface module includes at least one customer line connector, said customer lines being connected to said at least one customer line connector in a direction parallel to said printed circuit board.

14. A shelf assembly for receiving a plurality of telecommunications network interface units and for interconnecting customer lines with network service provider lines, said shelf assembly comprising:

a printed circuit board;

a plurality of network interface unit connectors on said printed circuit board for receiving said network interface units; and at least two customer interface module connectors for selectively and independently receiving a customer interface module;

wherein said shelf assembly further includes a top flange, a bottom flange, a first side flange and a second side flange, said top, bottom, first and second side flanges being positioned generally perpendicular to said printed circuit board and forming a housing area for said network interface units; and wherein said printed circuit board includes at least one network service provider line connector, said network service provider lines being connected to said at least one network service provider line connector in a direction perpendicular to said printed circuit board.

15. The shelf assembly of claim 14, wherein said at least one network service provider line connector is located above said top flange.

16. The shelf assembly of claim 15, wherein said first side flange and said second side flange extend beyond said top flange and said bottom flange, said shelf assembly further comprising a cover, said cover and said top and bottom flanges including openings for allowing said network service provider lines to pass therethrough.

17. A shelf assembly for receiving a plurality of telecommunications network interface units and for interconnecting customer lines with network service provider lines, said shelf assembly comprising:

a printed circuit board;

a plurality of network interface unit connectors on said printed circuit board for receiving said network interface units; and at least two customer interface module connectors for selectively and independently receiving a customer interface module;

wherein said shelf assembly further includes a top flange, a bottom flange, a first side flange and a second side flange, said top, bottom, first and second side flanges being positioned generally perpendicular to said printed circuit board and forming a housing area for said network interface units; and the shelf assembly further comprising a cover for selectively enclosing said printed circuit board, said top flange, said bottom flange, said first side flange and said second side flange; and wherein said shelf assembly is removably mounted to a back mounting plate; and wherein said back mounting plate includes cover locking slots, and said cover includes locking tabs which selectively engage said cover locking slots to secure said cover over said shelf assembly.

18. A wall rack assembly for selectively receiving and housing a plurality of network interface units and for interconnecting customer lines with network service provider lines; said assembly providing flexibility in mounting the assembly in the presence of an obstruction and comprising:

a shelf assembly having a plurality of network interface unit connectors, a first customer interface module connector and a second customer interface module connector, wherein each of said plurality of network interface unit connectors is operatively connected to each of said first customer interface module connector and said second customer interface module connector; and a customer interface module selectively and removably connectable to one of said first customer interface module connector and said second customer interface module, said customer interface module being connected to said first customer interface module connector when said second customer interface module connector is proximate said obstruction and said customer interface module being connected to said second customer interface module connector when said first customer interface module connector is proximate said obstruction.

19. The wall rack assembly of claim 18, further including a cover for said shelf assembly, said cover selectively positionable over and removable outwardly away from said shelf assembly so as to be unhindered by said obstruction.

20. A method of mounting a wall telecommunications rack assembly in a difficult to access location, said method comprising the steps of:

providing a shelf assembly having a plurality of network interface unit connectors, and at least a first customer interface module connector and a second customer interface module connector;

operatively connecting said plurality of network interface unit connectors to said at least a first customer interface module connector and a second customer interface module connector;

providing a customer interface module selectively and removably attachable to said shelf assembly; and selectively attaching said customer interface module to one of said at least a first customer interface module connector and a second customer interface module connector.

21. A shelf assembly for receiving a plurality of telecommunications network interface units and for interconnecting customer lines with network service provider lines, said shelf assembly comprising:

a printed circuit board;

a plurality of network interface unit connectors on said printed circuit board for receiving said network interface units; and at least two customer interface module connectors for selectively and independently receiving a customer interface module;

wherein said customer interface module comprises at least one customer line connector and an edge connector for connecting with one of said at least two customer interface module connectors, said at least one customer line connector being operatively connected to said edge connector.

22. A customer interface module comprising:

a housing;

a plurality of customer line connectors in the housing; and an edge connector on the housing, the edge connector being operatively connected to the plurality of customer line connectors;

wherein the edge connector is selectively, removably receivable in at least one corresponding connector on a telecommunications shelf assembly having a plurality of network interface unit connectors, wherein each of the plurality of network interface unit connectors are connected to said at least one corresponding connector.

* * * * *